United States Patent [19]

Janke et al.

[11] Patent Number: 4,992,926
[45] Date of Patent: Feb. 12, 1991

[54] PEER-TO-PEER REGISTER EXCHANGE CONTROLLER FOR INDUSTRIAL PROGRAMMABLE CONTROLLERS

[75] Inventors: Donald R. Janke; Kim J. Watt, both of Milwaukee, Wis.; Dirk I. Gates, Woodland Hills, Calif.; Joseph T. Bronikowski, Brown Deer, Wis.

[73] Assignee: Square D Company, Palatine, Ill.

[21] Appl. No.: 258,779

[22] Filed: Oct. 17, 1988

Related U.S. Application Data

[63] Continuation-in-part of Ser. No. 179,674, Apr. 11, 1988, Pat. No. 4,897,777.

[51] Int. Cl.[5] .................. G06F 15/46; G06F 15/16
[52] U.S. Cl. .................. 364/134; 364/140; 364/900; 364/926.9; 364/931.4; 364/942.1; 364/949; 364/951
[58] Field of Search .................. 364/131–136, 364/140–147, 138, 200, 900; 370/85.1–85.15, 94.1, 94.2, 101; 340/825.05–825.08, 825.14, 825.2, 825.22, 825.51, 825.52

[56] References Cited

U.S. PATENT DOCUMENTS

| | | | |
|---|---|---|---|
| 4,304,001 | 12/1981 | Cope | 364/132 X |
| 4,550,366 | 10/1985 | Toyama et al. | 364/136 |
| 4,570,257 | 2/1986 | Olson et al. | 364/131 X |
| 4,607,256 | 8/1986 | Henzel | 364/133 X |
| 4,608,661 | 8/1986 | Sasaki | 364/900 |
| 4,680,753 | 7/1987 | Fulton et al. | 370/85.8 |

Primary Examiner—Joseph Ruggiero
Attorney, Agent, or Firm—Michael J. Femal; Thomas K. Stine

[57] ABSTRACT

A communication network for programmable logic controllers (PLC) wherein selected memory means of each PLC has at least two ports directly accessible by other PLC and certain registers of the PLC are identical. Each PLC further has an interblock gap timer to signal the PLC when its transmit time slice is to occur. The time slice consists of a block transmit time and an interblock gap time. The total update time has been optimized to engable efficient, high-speed transfer of blocks of data between the PLCs.

8 Claims, 3 Drawing Sheets

NETWORK CONNECTION

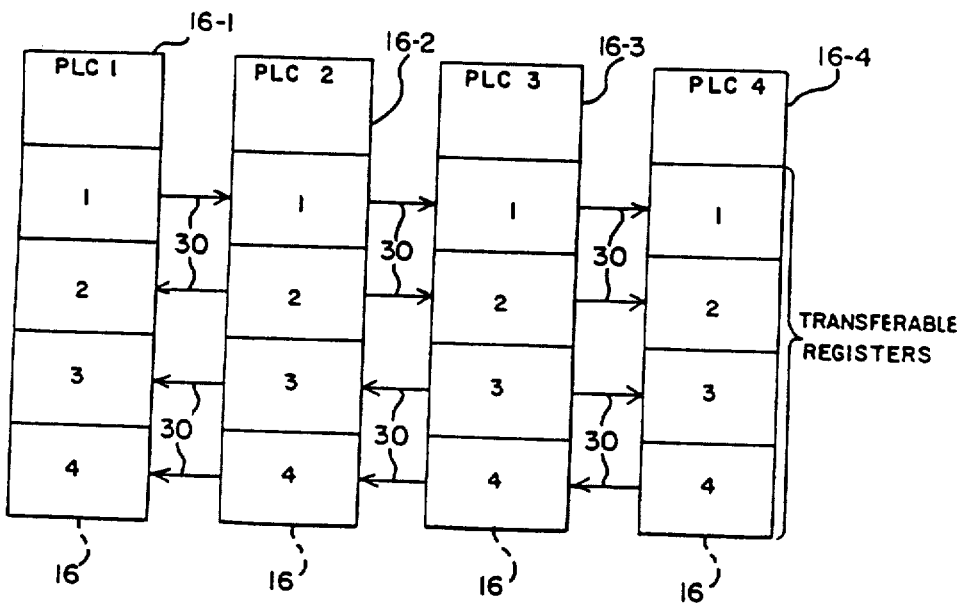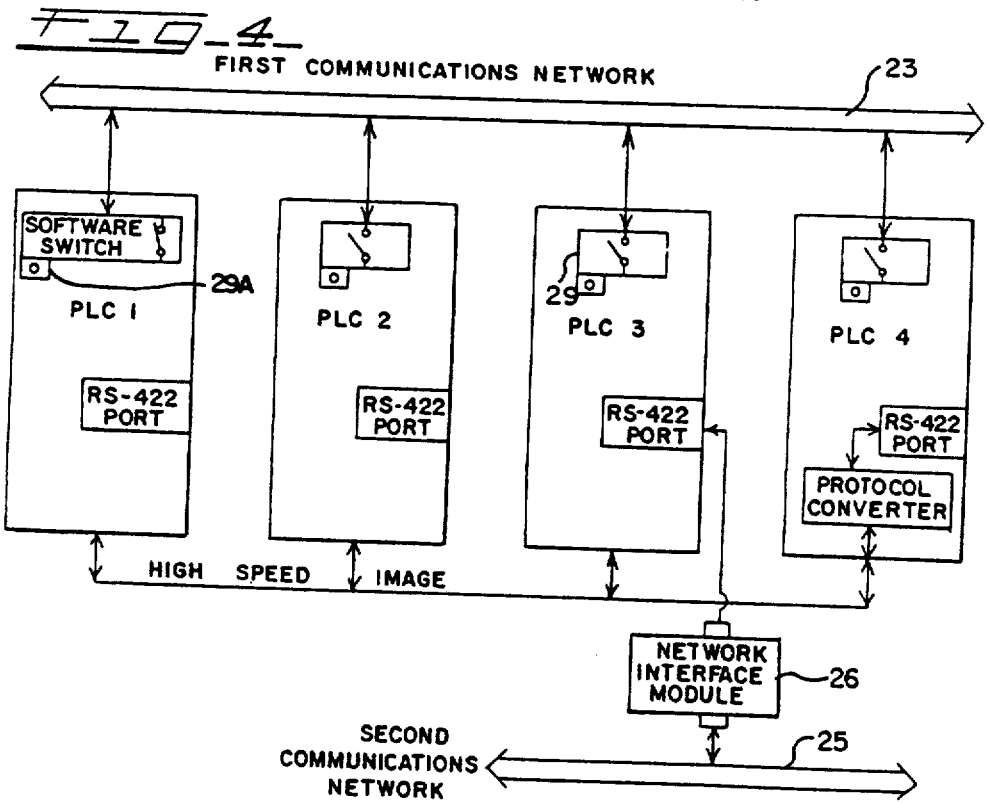

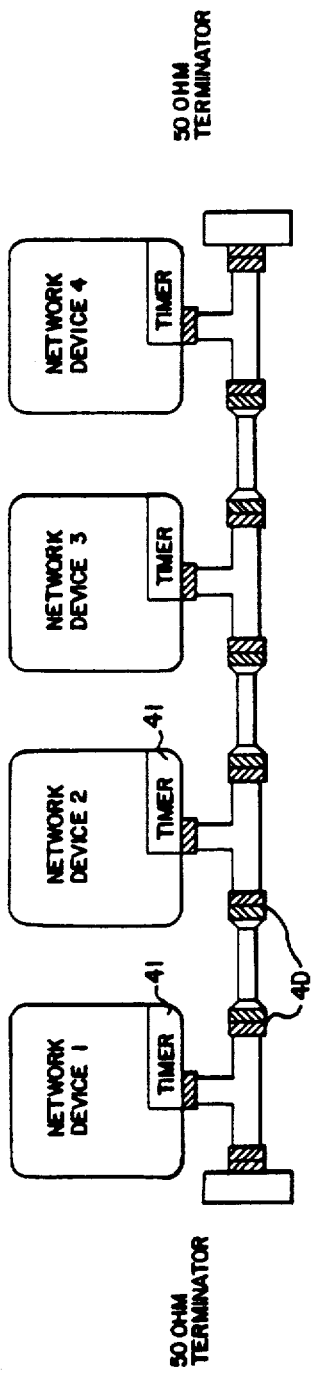
FIG. 5 — NETWORK CONNECTION
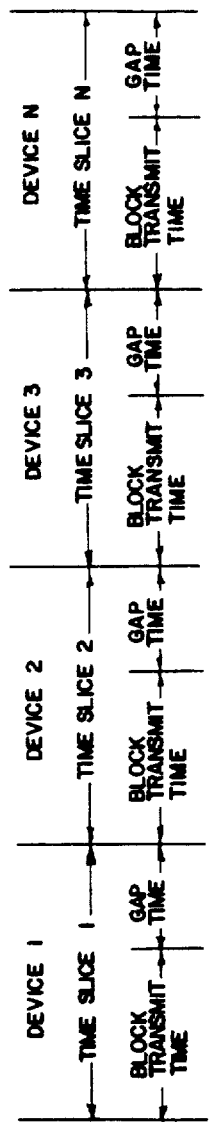
FIG. 6 — NETWORK TIME SLICE DIVISIONS

PEER-TO-PEER REGISTER EXCHANGE CONTROLLER FOR INDUSTRIAL PROGRAMMABLE CONTROLLERS

REFERENCE TO RELATED APPLICATIONS

This application is a continuation-in-part application of U.S. Ser. No. 179,674, filed Apr. 11, 1988, U.S. Pat. No. 4,897,777.

This application is also related to applications filed Apr. 11, 1988, entitled "Network Communications System", Ser. No. 179,969, U.S. Pat. No. 4,912,623; "Ladder Sequence Controller", Ser. No. 180,093; "High-Speed Press Control System", Ser. No. 179,743, and, "Network Interface Board System", Ser. No. 179,756. The contents of these applications are incorporated herein by reference.

TECHNICAL FIELD

This invention relates generally to interconnecting programmable logic controllers connected together to effect sequential program instructions and particularly relates to interconnecting image memory portions of several programmable logic controllers to enable operation at a speed much greater than the operating speed of the programmable logic controllers functioning independently.

BACKGROUND OF THE INVENTION

In the past, programmable logic controllers have received sensor information over a communications network or over discrete leads from the machine tool being controlled. The programmable logic controller or PLC processes the sensor information according to sequential instructions contained in its program memory portion. The result of the processing of the sensor information often results in command information that the PLC transmits to switches or actuators on the controlled machine tool over the communications network or on discrete leads.

PLCs normally include an image memory which contains registers and addresses assigned to reflect the condition of the various sensors monitoring the machine tool. Information from the sensors and received at the PLC becomes stored at certain registers and the processing instructions in the PLC operate on the information contained in the image memory. Some PLCs include two processors to obtain increased operating speed: one is a control processor that handles communications with the sensors and drivers to move information to and from the image memory and that assigns tasks to the second processor; and the second is a SCAN processor that effects the sequential processing instructions to obtain information from the image memory and provide solutions to other certain addresses in the image memory under control of the control processor.

While this latter arrangement has obtained higher processing speeds, further speed increases are desired.

SUMMARY OF THE INVENTION

The invention provides a high-speed interconnection between the image memory portions of several PLCs operating together. This allows each PLC to operate on a portion of a sequential instruction set and for the solution obtained by each PLC to appear in the image memory portions of the other PLCs at a time that is effectively simultaneous with the solution.

Moreover, the high-speed image memory transfers between the PLCs occur with parity and CRC checking at each PLC before the information is written into the image memory of that PLC to verify the accuracy of the information transfer between the image memories. The foregoing not only obtains increased operating speed but guarantees the accuracy of the information transferred between image memory portions of the PLCs.

Other advantages and aspects of the invention will become apparent upon making reference to the specification, claims, and drawings to follow.

DESCRIPTION OF THE DRAWINGS

FIG. 3 is a block diagram showing transferable register of each of the four PLCs and indicating transfer of blocks between the registers by the arrowed lines;

FIG. 4 shows the manner of connection between two communication networks.

FIG. 5 is a more detailed view of the connections of the operating devices I . . . N of the communications network; and, FIG. 6 is a sketch depicting the block transmit and gap times of the devices.

DETAILED DESCRIPTION OF THE INVENTION

Figure 1:
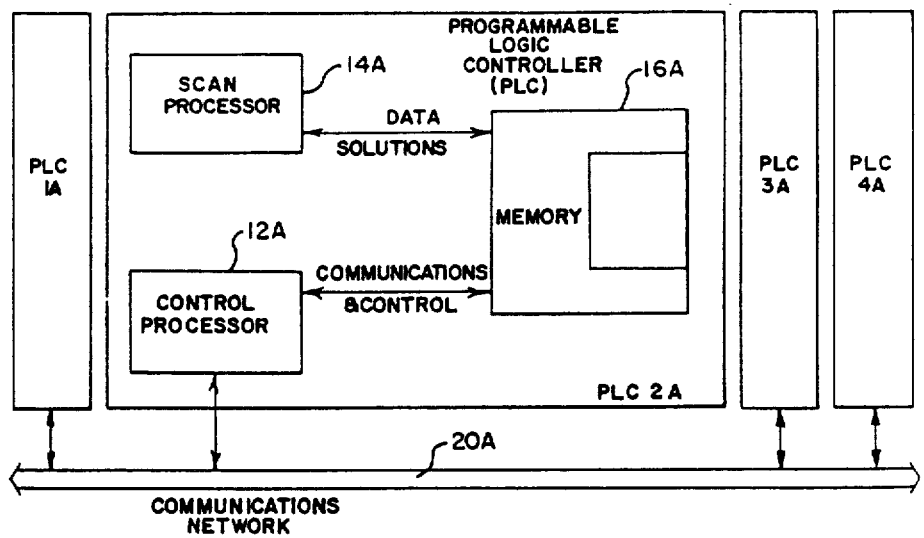
FIG. 1 is a block diagram of four programmable logic controllers (PLCs) connecting to a communications network.

While this invention is susceptible of embodiment in many different forms, there is shown in the drawings and will herein be described in detail a preferred embodiment of the invention. The present disclosure is to be considered as an exemplification of the principles of the invention and is not intended to limit the broad aspect of the invention to embodiment illustrated.

FIG. 1 shows a presently used communications network including a group of 4 programmable logic controllers (PLCs) numbered 1A to 4A. Each of the PLCs include a control processor 12A, a scan processor 14A and an image memory 16A. As noted in FIG. 1, the memory 16A is accessed by the control processor 12A to obtain or provide communications and control data. The scan processor 14A in turn accesses the image memory 16A and then through the control processor 12A to the communications network 20A.

Figure 2:
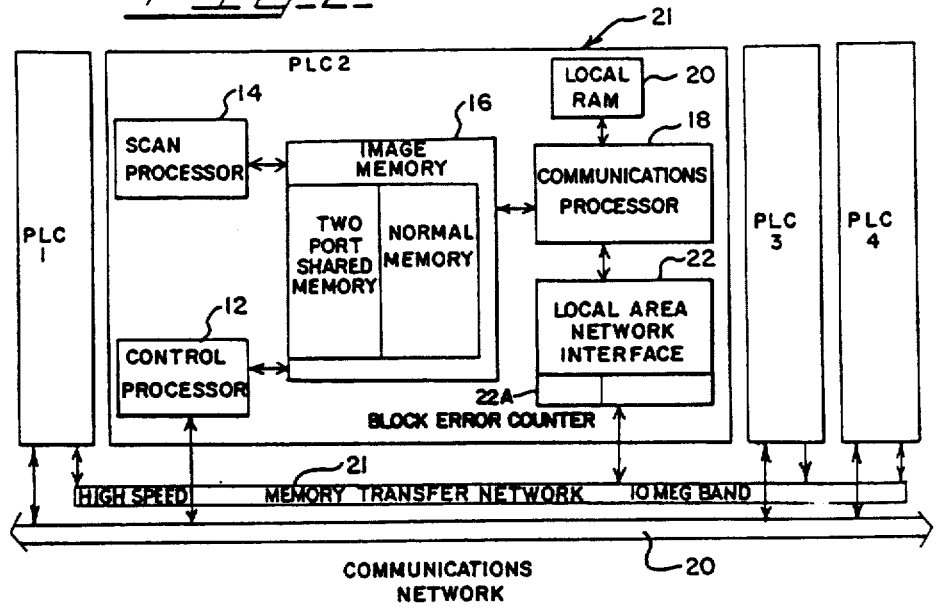
FIG. 2 is a block diagram of a modification of the diagram of FIG. 1 which includes a high-speed memory transfer network in accordance with the invention.

FIG. 2 shows a communications network 21 of the invention including four programmable logic controllers (PLCs) 1 to 4, although up to 16 PLC's can be used. Each of the PLCs includes a control processor 12, a scan processor 14, and a memory 16. Referring to FIG. 2, the memory 16, for a device with peer-to-peer communications, is further divided into three sections, the normal memory, image memory and the two port shared memory. It is this shared memory and its operation that allow these programmable logic controllers to operate in a peer-to-peer (slave-to-slave) fashion. Importantly, each of the PLCs further include a communications processor 18, a local RAM (Random Access Memory) 20 and a local area network interface 22. The local area network interface 22 connects to high speed image memory transfer network 21.

As mentioned above, and as will be explained in detail hereinbelow, the image memories 16 of each of the PLCs 1 to 4 are interconnected and are, in effect, commonly accessed by the network devices and by the other PLCs to provide a higher speed of network communication and transfer of data.

Refer now to FIG. 3 which shows the image memory 16 map 16-1, 16-2, 16-3 and 16-4 of each of the PLCs 1 to 4. The memory maps of the PLCs are similar and each consists of 2 to 6 blocks. For simplicity of explanation, the transferable memory of each PLC represented in FIG. 3 will be divided with 4 blocks. As each block of registers has an assigned time slot when it transfers blocks of registers, each device sends a different block of registers. This is shown in FIG. 3 wherein the arrowed line generally marked as 30 indicates the transfer of block register 1 of PLC 1 to PLC 2, PLC 3 and PLC 4. PLC 3 transfers the block register 3 to PLC 1, PLC 2 and PLC 4, and PLC 4 transfers the block of registers 4 to PLC 1, PLC 2 and PLC 3.

FIG. 4 shows circuitry for coupling from a first communications network 23 to a second communications network 25. This is accomplished through a dual port network interface module 26 as explained in co-pending U.S. patent application Ser. No. 179,756 entitled "Network Interface Board System". As clearly shown in FIG. 4, communications network 25 communicates through a network interface module 26 with RS-422 port in PLC 3 and a software switch 29 to communications network 23. This type of connection may be made necessary when the first network 23 is supporting or has connected to it its maximum load of 100 network interface modules 26 and 200 devices (machines to be controlled, printers, terminals, computers, etc.).

The peer-to-peer network is able to transfer blocks of registers between 2 to 16 devices and each device sends a different block of registers. Each block of registers is assigned a mailbox location and the location of the mailbox is dependent on the identification number that each device is assigned.

Refer now to FIGS. 2, 5 and 6. As shown in FIG. 5, the peer-to-peer network uses coaxial cable for connections. Each of the nodes is electrically isolated from the other. All the devices 1 ... N are connected with "T" connectors, generally labeled as 40 in FIG. 5 and with 50 ohm coaxial cable.

A time slice is allocated for each of the device 1 ... N, that may be on the loop, see FIG. 6. The number of time slices allocated is determined by the maximum number of devices on the network. Each time slice is composed of two parts; first, the time necessary to send a block of data; and secondly, an interblock gap time, as depicted in FIG. 6.

In operation, the lowest numbered device on the network sends its packet or block, and the network then delays a gap time. The next device in sequence transmits its block, and the network again waits a gap time and so on, until each of the devices transmits its block. If a device is not on the loop, the network inserts a gap time where the non-existent device's gap time would be.

The time necessary to send all the blocks on the network is the sum of the times to send the data blocks of the devices actually on the network plus the sum of the interblock gap times of all the devices that could be on the network.

When a device powers up, it reads its internal setup switch, and determines the network size and block size. Based on this data, it calculates the interblock gap time of each device, and the total interblock gap time. Thus, in effect, the total interblock gap time is calculated by multiplying the interblock gap time by the maximum number of devices on the network.

Each device maintains an interblock gap time timer 41, as indicated in FIG. 5, of any suitable known type. Timer 41 only times when the device is not receiving data, and it holds its count when data is being sent on the network. The gap timer 41 can be reloaded at any time with a new value.

The communication update rate is a function of the actual number of devices on the network, and the block size. The following table gives the time to transmit one block for each of the allowable block sizes.

| Block Size Registers | Time to Update One Block (uS) | Gap (uS) |
|---|---|---|
| 32 | 180 | Preset |
| 64 | 240 | Preset |
| 128 | 335 | Preset |
| 256 | 535 | Preset |
| 512 | 950 | Preset |

The update time for a given installation can be determined by multiplying the block time for a single update by the actual number of devices on the network. For example, if a device were coded for a maximum of 16 devices on the network, but only 8 devices were on the network with a block size of 32 registers, the total update time would be $180 \times 8 = 1440$ uS.

When a device joins the network, it loads its interblock gap timer 41 with the total gap time, and listens to the network. If no blocks are received within the total interblock gap time, it implies that there are no other devices on the network, and the device transmits its block and reloads its interblock gap timer with the total gap time. It again listens on the network for another device and if no device is found, it will again transmit its block when the interblock timer times out. This action will continue until another device joins the network.

To reduce the probability of a data collision or "crash" on the network, if two devices power up at the same time, the timer 41 for device 1 is loaded with total gap time plus 0 gap times, the timer 41 for loaded with total gap time plus 1 gap, and the timer 41 for device N is loaded with the total gap time plus n−1 gap times.

If another device (say, device N) joins the network, the interblock timer for device N is loaded with the total interblock time. Device N then listens to the network. When it gets the transmission from one of the other devices on the network, it stores the block, and determines the device from which the transmission was received, and how many interblock gap times are required before it (device N) is to transmit. When the timer for device N times out, device N will transmit its block. Each of the other devices reset their intergap timer 41 based on their particular position in the loop.

Stated another way, each time a device transmits, other devices in the network reload their timer with a new number or value until their turn to transmit comes up. Thus, each time a device (say, device 1) transmits, all the other devices are listening, and each of the other devices reload their own gap timer with a number indicating the total gap time to their transmission slice. Accordingly, all other devices are allowed to sequentially transmit, in their turn, before device 1 is allowed to transmit again. Immediately upon transmitting, a device reloads its own gap timer with the total gap time and thus takes its position at the "end of the line".

Thus, when additional devices are placed on the network, they load their interblock timers 41 with the total gap time as before. When they receive the first block of data, they will store the block, and based on the address of the block, reload their interblock gap timer.

When a device is removed from the loop, the total interblock gap time remains the same. Since the interblock timers 41 do not time when any devices are transmitting data blocks, all the tiers of the devices on the loop will be correct. As an example, consider the case of the loop described above. Assume that device 1 has just transmitted, causing it to load its timer with four gap times, device 2 with one gap time, and device 3 with 2 gap times. If device 2 is now removed from the network, device 3 will be the first to time out after two gap times. It will then transmit its block, and load its timer with four gap times. Device 1 will load its timer with two gap times. The first timer to time out will be number 1. It will transmit its block, and load its timer with four gap times. When device 3 receives the block, it will load its timer with three gap times as before. The result is that the total gap time has remained the same, except that there is one less data block transmitted on the network.

Data blocks are protected with a CRC (Cyclic Redundancy Check), as is known in the art. If a bad block is detected by the communication processor 18, the bad block will not pass to the shared register area. If a bad block is detected, a new data bit will not be toggled and a consecutive block error counter 22A, see FIG. 2, will be incremented. The block error counter 22A, which may be of known design, is cleared to zero by the communication processor 18 when a good block of data is received, or during loop formation. If the error counter 22A is greater than the value programmed for that device, the communication processor 18 will generate an error. Depending on the state of a programmable failure over-ride bit, this can cause the control processor 12 to halt.

There is one block error counter 22A and one user programmable maximum consecutive block error limit for each mailbox location in the local area network interface 22. Every time a device is required to transmit, it checks to see from what devices it has received good blocks during the last loop. The consecutive error count register 22A is incremented for every device from which a good block of data was not received. If the block error counter 22A of a device exceeds the maximum allowed errors, that device will set the device error flag and halt its control processor 12, if the failure over-ride bit for the device is not set.

Ladder scans of the processors on the network can be automatically synchronized. This allows the processors to scan at the same time and facilitates parallel processing.

The network interface 22 receives and transmits data over the peer-to-peer network. The data is sent in block form with CRC protection and parity protection on each block. The transmission method does not use collision detection schemes and is completely deterministic in the time domain. The network interface uses the shared register area (two port) as storage or the location to get messages.

The communication processor takes care of all processing required by the peer-to-peer network. It has access to the serial network interface and two port memory. It also has inputs to the setup switches. The communication processor sets up the network protocols and reports network status to the user through the two port memory. The communication processor does most communication with the control processor through the two port memory.

Each PLC device has a bank of switches 29 for setup. The state of the switches is read once at power up by the communication processor. One switch 29A is a rotary switch to set up the identification number of the device from 0 to F. Every device connected to the peer-to-peer network must have a unique identification number or the network will not operate properly. Labeling on the front panel allows the user to indicate the device ID number.

The other switches are arranged as follows:

1. (Bit 1-2) This code indicates the maximum number of units in the network. For fastest network formation time, the smallest possible number should be selected. All devices on the network must have the same code set up or the network will not operate properly. The code is as follows:

| Code | Max. Number of Units on the Network |
| --- | --- |
| 0 | 2 |
| 1 | 4 |
| 2 | 8 |
| 3 | 16 |

2. (Bit 3-4) This code indicates the block size. The block size is the number of registers sent from a device on the network to all other devices on the network. All devices on the network must have the same code or the network will not operate properly. The code is as follows:

| Code | Size of Block (Registers) |
| --- | --- |
| 0 | 32 |
| 1 | 64 |
| 2 | 128 |
| 3 | AUTO |

The AUTO position automatically configures the maximum number of registers possible based on the setting of the Maximum Number of Units on the Network switch. The following table describes this relationship:

| Max. Number of Units On The Network | Number of AUTO Register |
| --- | --- |
| 2 | 512 |
| 4 | 256 |
| 8 | 128 |
| 16 | 64 |

The 1024 "shared data registers" can be arranged in any one of 4 different block size configurations. They are: 2 blocks of 512 registers, 4 blocks of 256 registers, 8 blocks of 128 registers or 16 blocks of 64 registers.

In addition to the above shared registers, the PLC device has a "peer-to-peer control register" at location 8096. This register will allow the user to configure the shared registers for the particular application. The bits in this register are dynamic in that they can be changed by the user program at any time.

Table 1 contains a map of the shared registers which are divided into 5 main sections. There are: 8 control data registers, 5 spare registers, 3 miscellaneous registers, 16 communications status registers, and 1024 data registers. An explanation of the register follows:

TABLE 1
SHARED REGISTERS MEMORY MAP

| | | | |
|---|---|---|---|
| Control | 8000 | Error Code | |
| Date Write | 7999 | DIP Switch Image | |
| Protected | 7998 | Device ID | |
| (8) | 7997 | Block Size | |
| | 7996 | Number of Blocks | |
| | 7995 | Comm to CPU Handshake | |
| | 7994 | Main-CPU Handshake | |
| | 7993 | Reflectometry Counter | |
| | 7992 | Spare | |
| Share | 7991 | Spare | |
| (5) | 7990 | Spare | |
| | 7989 | Spare | |
| | 7988 | Spare | |
| | 7987 | Count of Loop Formations | |
| Misc | 7986 | Max Consecutive Block Errors | |
| (3) | 7985 | Failure Override Control | |
| | 7984 | PLC Device | 0 |
| | 7983 | | 1 |
| | 7982 | | 2 |
| | 7981 | | 3 |
| | 7980 | | 4 |
| Communi- | 7979 | | 5 |
| cation | 7978 | | 6 |
| Status | 7977 | | 7 |
| Registers | 7976 | | 8 |
| (16) | 7975 | | 9 |
| | 7974 | | 10 |
| | 7973 | | 11 |
| | 7972 | | 12 |
| | 7971 | | 13 |
| | 7970 | | 14 |
| | 7969 | | 15 |
| Data | 7968 | Shared Data | |
| Registers | " | " | |
| (1024) | " | " | |
| | 6945 | Shared Data | |

Error Code (8000)

If the communication processor detects an error, it will post an error code in this register.

The following error codes are supported:

| | Code | Meaning |
|---|---|---|
| A | 0 | No error |
| B | 1 | Address Error |
| C | 2 | Bus Error |
| D | 3 | Parity Error |
| E | 4 | Handshake Failure |
| F | 5 | Main Processor Failure |
| G | 6 | PROM Checksum Test Failure |
| H | 7 | Local RAM Read After Write Test Failure |
| I | 8 | Local RAM Destructive Test Failure |
| J | 9 | Shared RAM Read After Write Test Failure |
| K | 10 | Shared RAM Destructive Test Failure |
| L | 11 | Local Area Network Controller Test Failure |
| M | 12 | Shared Register Block Exceeds 1024 Registers |
| N | 13 | Incorrect Block Size Received |
| O | 14 | Address greater than |

-continued

| | Code | Meaning |
|---|---|---|
| P | 15 | Number of Devices on the Network Duplicate Address Detected |
| Q | 16 | Block Error Limit Exceeded |

The Dip Switch Image (7999) register contains an image of the peer-to-peer dip switch. The user can read this register to find out how the dip switch is set without removing the device from the rack. The communication processor writes the data to this location.

The Device ID (7998) register contains the ID code assigned to this unit. The communication processor decodes the ID code from the dip switch settings and places it here.

The Block Size (7997) register contains the peer-to-peer block size. The communication processor decodes the block size from the dip switch settings and places it here.

The Number of Blocks (7996) register contains the maximum number of blocks transferred by the peer-to-peer network. The communication processor decodes the maximum number of blocks from the dip switch setting and places it here.

The Comms to CPU Handshake (7995) is an internal register used by communication processor to handshake with the control processor.

The Main CPU Handshake (7994) is an internal register used by control processor to handshake with the communication processor.

The Time Domain Reflectometry Counter (7993) counts proportional to the length of the cable. A counter is started when a transmission is started from a unit. Reflections from the cable end terminate the count. The value should be constant for a given installation and device on the network. It has value as a trouble shooting tool.

Spare Registers for Future Expansion (7992-7988) are registers reserved for future expansion.

During power up and conditions of extraordinary network disturbances, the network may be automatically reformed. The Count of Loop Formations (7987) register contains a count of the number of times the network has been reformed.

The Maximum Consecutive Block Errors (7986) register is programmed by the user to indicate the maximum number of consecutive block errors before the system automatically generates an error and goes to HALT.

When the bits in the Failure Override Control (7985) registers are zero, the PLC will generate an error if the communication processor detects (n) consecutive errors in a row where (n) is determined by the contents of the previous maximum consecutive block errors. If a bit is set to one, the error will not be generated. Bit 1 corresponds to PLC device 1, Bit 2 to PLC device 2 and so on, up to PLC device 15.

The Communication Status Registers (CSR) (7984-7969) are written to by the communication processor to give the status of individual communication channels. There is one register for each communications register.

While the invention has been described with reference to a preferred embodiment, it will be understood by those skilled in the art that various changes may be made and equivalents may be substituted for elements thereof without departing from the broader aspects of the invention. Also, it is intended that broad claims not specifying details of a particular embodiment disclosed herein as the best mode contemplated for carrying out the invention should not be limited to such details.

We claim:

1. A peer-to-peer communications network for high-speed transfer of data in registers and control data between devices comprising, in combination:
   a communications network having an update time that is a function of the number of devices on the network, said update time being the time required for every device to be updated by every other device on the network,
   at least two programmable logic controller devices connected to communicate with said network, a memory means for each of said devices, said memory means having at least two ports, means for connecting each of said devices to have direct access to each of said memory means, means for allocating a transmission time slice for each of said devices, said time slice comprising a block transmit time and an interblock gap time, means for determining the total interblock gap time, said time representing the total gap time between each said devices subsequent transmission time slices, and an interblock gap timer for each device for timing when the associated device is not receiving data and for holding its count when data is being sent on said communications network.

2. A peer-to-peer communications network as in claim 1, wherein each of said devices transmits its block of data sequentially.

3. A peer-to-peer communications network as in claim 1, wherein the total interblock gap time is determined by multiplying the interblock gap time of each device by the maximum number of devices on the network.

4. A peer-to-peer communications network as in claim 1, wherein said interblock gap timers may be reloaded at any time with a new value.

5. A peer-to-peer communications network as in claim 1, wherein the update time is determined by the actual number of devices on the communications network.

6. A method for adding devices to a peer-to-peer communications network, wherein each of the devices transmits blocks of data, and each devices includes an interblock gap timer consisting of the steps of:
   (a) providing a block transmission time and a gap time for a maximum number of devices in the network,
   (b) coupling a device to the network and assigning the device a transmitting position,
   (c) loading the interblock gap timer to signal the device when it should first transmit,
   (d) signaling the device to listen to the network,
   (e) enabling the device to transmit a block of data,
   (f) reloading the interblock gap timer of the device to signal the device when it should transmit again, and,
   (g) repeating steps (d), (e), and (f).

7. A method for adding devices to a peer-to-peer communications network as in claim 6 wherein the device interblock gap timer is loaded with the total interblock gap time to signal when that device transmits.

8. A method for adding devices to a peer-to-peer communications network as in claim 6 wherein the interblock gap timer of each succeeding device is loaded with a gap time indicative of its transmitting positions from the last device in the network from which it received data.

* * * * *